(12) United States Patent
Bayruns

(10) Patent No.: US 7,400,873 B2
(45) Date of Patent: Jul. 15, 2008

(54) METHOD AND SYSTEM FOR IMAGE REJECTION BY USING POST MIXER I/Q EQUALIZATION

(75) Inventor: John Thomas Bayruns, Bridgewater, NJ (US)

(73) Assignee: Anadigics, Inc., Warren, NJ (US)

( * ) Notice: Subject to any disclaimer, the term of this patent is extended or adjusted under 35 U.S.C. 154(b) by 457 days.

(21) Appl. No.: 11/254,386

(22) Filed: Oct. 20, 2005

(65) Prior Publication Data

US 2007/0093228 A1    Apr. 26, 2007

(51) Int. Cl.
*H04B 1/18*    (2006.01)
(52) U.S. Cl. .................. 455/302; 455/305; 455/323
(58) Field of Classification Search ............ None
See application file for complete search history.

(56) References Cited

U.S. PATENT DOCUMENTS

| | | | |
|---|---|---|---|
| 4,833,419 A | 5/1989 | Chrystie | |
| 5,870,670 A * | 2/1999 | Ripley et al. | 455/304 |
| 6,278,870 B1 * | 8/2001 | Davie et al. | 455/302 |
| 6,631,257 B1 | 10/2003 | White et al. | |
| 2003/0165203 A1 * | 9/2003 | Mohindra | 375/324 |
| 2007/0058754 A1 * | 3/2007 | Lin et al. | 375/332 |

OTHER PUBLICATIONS

Farbod Behbahbani, Yoji Kishigami, John Leete, and Asad A. Abidi, CMOS Mixers and Polyphase Filters for Large Image Rejection, IEEE Journal of Solid-State Circuits, Jun. 2001, vol. 36, No. 6.

* cited by examiner

*Primary Examiner*—Thanh C Le
(74) *Attorney, Agent, or Firm*—William L. Botjer

(57) ABSTRACT

The invention provides a system and method for tuning broadband signals by using post mixer I/Q equalization. An Image Rejection Mixer (IRM) is used for mixing Radio Frequency (RF) signals and rejecting image signals from the desired RF signals. The IRM includes an I/Q mixer and a filter. The I and Q paths resulting from the mixing operation in the I/Q mixer are equalized in amplitude and phase by an I/Q equalizer. Thereafter, the image signals are rejected from the desired RF signals using the filter.

14 Claims, 5 Drawing Sheets

METHOD AND SYSTEM FOR IMAGE REJECTION BY USING POST MIXER I/Q EQUALIZATION

BACKGROUND OF THE INVENTION

1. Field of the Invention

The present invention relates generally to broadband tuners. More specifically, it relates to systems and methods for image rejection from desired Radio Frequency (RF) signals.

2. Description of the Related Art

Broadband tuners are used in various electronic devices, such as televisions (TV), for transmission and reception of RF signals at particular frequencies. Broadband tuners include RF mixers that are used to convert RF signals at a particular frequency to RF signals at another frequency. This conversion is usually referred to as mixing RF signals. Mixing RF signals involves mixing of Local Oscillator (LO) signals with the input broadband signals. The output RF signals of the RF mixer usually include the desired RF and image signals. The image signals are unwanted signals that need to be rejected from the output RF signals, to provide the desired signals at the output. Filters such as SAW filters, variable bandpass filters, and polyphase filters are used to reject the image signals from the output RF signals.

Broadband tuners usually provide up to 40 dB of image rejection. Broadband TV tuners require up to 70 dB of image rejection for better transmission of the desired RF signals. In the present state of the technology, there are methods that provide up to 70 dB of image rejection. These methods require the implementation of double-conversion tuners with fixed IF SAW filters, single-conversion tuners with complex input tracking filters or single-conversion tuners with wide band matching techniques before the mixing operation. One such single conversion tuner with a double quadrature mixer is described in a publication titled "CMOS Mixers and Polyphase Filters for Large Image Rejection", by Farbod Behbahani, Yoji Kishigami, John Leete and Asad A. Abidi, and published in IEEE Journal of Solid-State Circuits, June 2001, vol. 36, No. 6.

However, in the above methods and systems, the size of the circuit and/or its non-linearity is increased. Moreover, the wide band matching technique reduces the signal-to-noise ratio of the broadband tuners.

In light of the above, there is a need for a system and method for broadband tuning with the desired amount of image rejection. Further, the system should provide high linearity and high signal-to-noise ratio without substantially increasing the size of the circuit.

SUMMARY OF THE INVENTION

An object of the invention is to provide a desired amount of image rejection in RF transmission, independent of mixing operation.

Another object of the invention is to provide the image rejection without increasing the size of a tuner.

Another object of the invention is to the provide image rejection with high linearity in RF transmission.

Yet another object of the invention is to provide a high signal-to-noise ratio in RF transmission.

To achieve the above-mentioned objectives, the invention provides a system and method for image rejection in RF transmission. Image rejection greater than 70 dB is achieved if the input signals to the filter are matched. The system utilizes a post mixing equalization technique for equalizing the input signals provided to the filter. The amplitudes of the differential output signals of an I/Q mixer are equalized and their phases are aligned in quadrature. The difference in amplitudes of the differential output signals is sensed by a level detect circuit and the amplitudes are equalized by adjusting the gains of Variable Gain Amplifiers (VGA). Further, phases of the differential output signals are aligned in quadrature by addition of these signals. Polyphase filters, for the transmission of the desired RF signals, thereafter reject the image signals In accordance with the invention, various circuit blocks of the system can be utilized in the analog as well as the digital domain to provide the desired amount of image rejection. Further, the circuit blocks may be designed by using various types of transistor devices and topologies. Further, the size of the circuit is reduced.

BRIEF DESCRIPTION OF THE DRAWINGS

So that the manner in which the above recited features of the present invention can be understood in detail, a more particular description of the invention, briefly summarized above, may be had by reference to various embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Various embodiments of the invention provide systems and methods for tuning broadband signals. Broadband signals are tuned by rejecting image signals from the desired RF signals by using a post mixer equalization technique. During the equalization, the differential output signals of an I/Q mixer are equalized in amplitude. Further, the phases of the differential output signals are aligned in quadrature by the addition of these signals. Filtering the desired RF signals provides the desired amount of image rejection.

Figure 1:
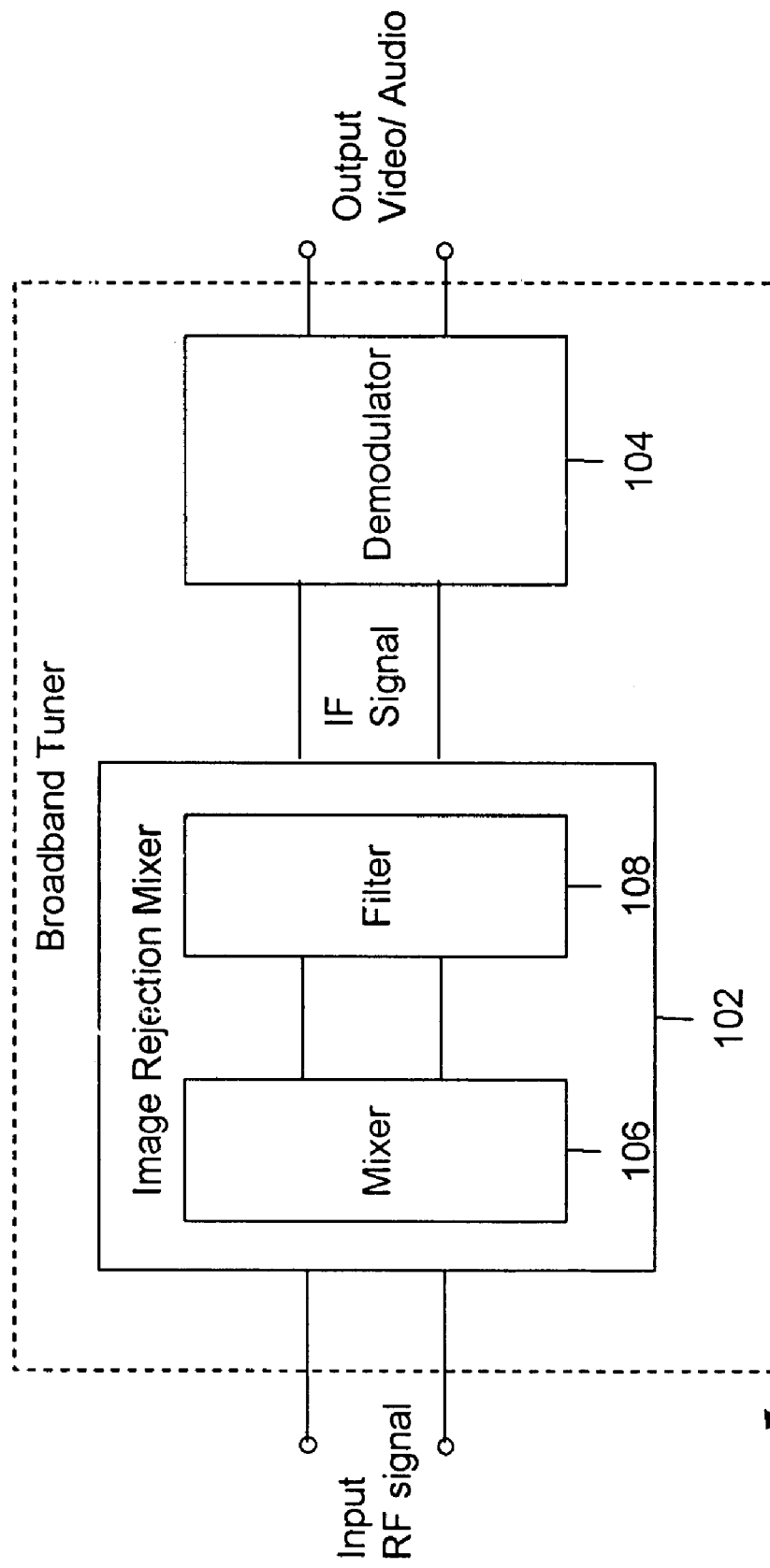
FIG. 1 is a view of a block diagram depicting an exemplary prior art tuner in which various embodiments of the invention may be practised.

FIG. 1 is view of a block diagram depicting an exemplary prior art tuner 100 in which various embodiments of the invention may be practised. Tuner 100 includes an Image Rejection Mixer (IRM) 102 and a demodulator 104. IRM 102 includes a mixer 106 and a filter 108. Tuner 100 tunes the input RF signals to desired RF signals. In one embodiment of the invention, tuner 100 is a broadband tuner.

Mixer 106 converts the input RF signals at a particular frequency to RF signals at another frequency. During the mixing operation, two signals, i.e., the RF signal and an image signal are obtained at the output of mixer 106. Filter 108 rejects the image signal, i.e., the unwanted signal, and passes the desired RF signals. The desired RF signals are obtained as Intermediate Frequency (IF) signals at the output filter 108. Demodulator 104 demodulates the IF signals to obtain the desired audio/video signals.

In various embodiments of the invention, the input RF signals are broadband signals. In various embodiments of the invention, the input broadband RF signals are supplied through a Community Access Television (CATV) infrastructure. In various embodiments of the invention, mixer 106 may be an I/Q mixer and filter 108 may be a polyphase filter.

Figure 2:
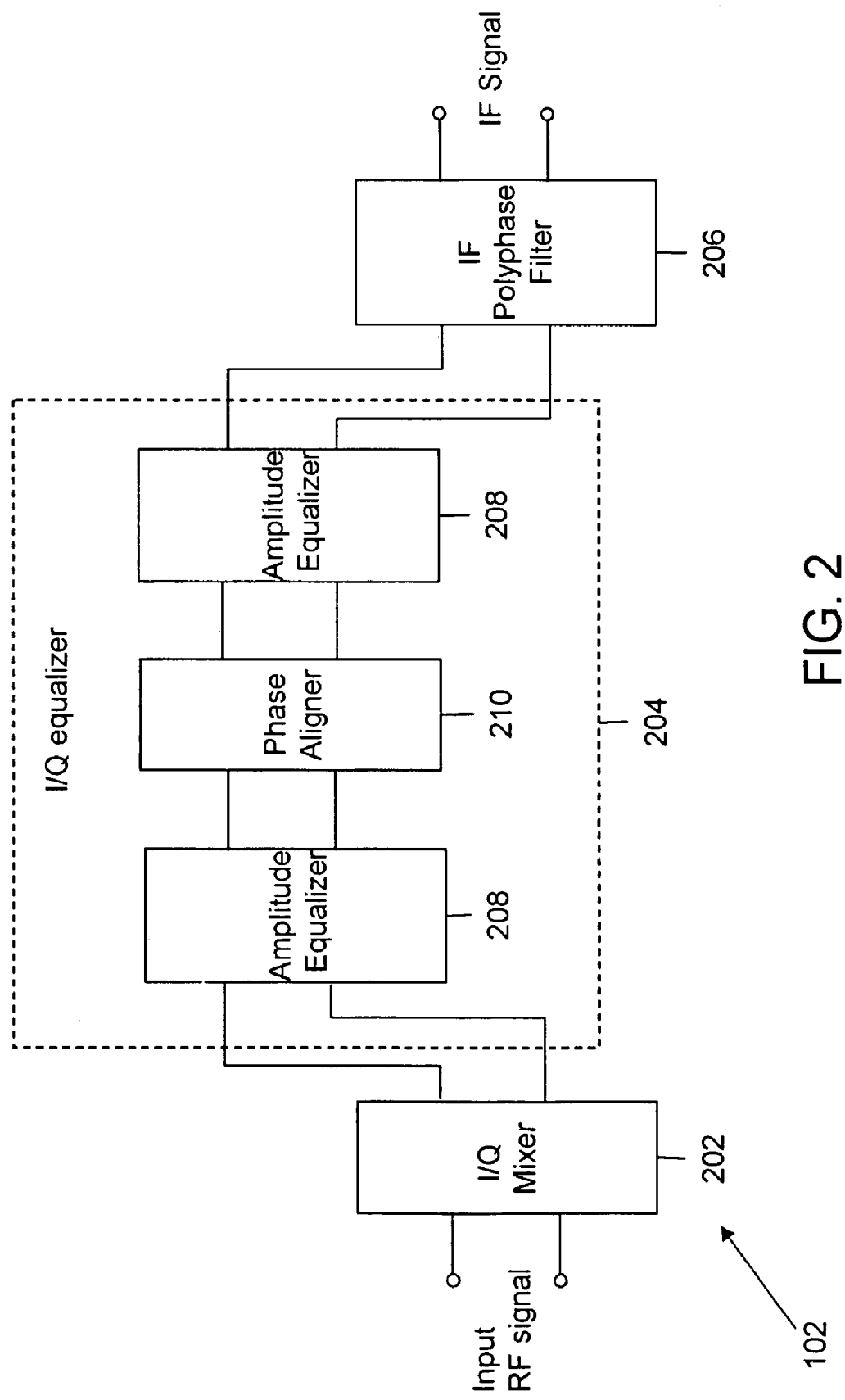
FIG. 2 is a view of a block diagram of an image rejection mixer (IRM), in accordance with various embodiments of the invention.

FIG. 2 is a view of a block diagram of IRM 102, in accordance with an embodiment of the invention. IRM 102 includes an I/Q mixer 202, an I/Q equalizer 204, and an IF polyphase filter 206. I/Q equalizer 204 includes one or more amplitude equalizers 208, hereinafter referred to as amplitude equalizer 208, and a phase aligner 210.

I/Q mixer 202 converts input broadband RF signals into an in-phase (I) and a quadrature phase (Q) path. IRM 102 provides the desired amount of image rejection, i.e., more than 70 dB of image rejection when the I and Q output paths of I/Q mixer 202 have equal amplitudes and phases in exact quadrature.

Amplitude equalizer 208 equalizes the amplitudes of the I and Q paths. The I and Q paths, after amplitude equalization, are provided to phase aligner 210. Phase aligner 210 aligns the phases of the I and Q paths with equalized amplitudes in quadrature. The phases are aligned by adding the I and Q paths. In various embodiments of the invention, the amplitudes of the I and Q paths may not be equal after the phases of the I and Q paths are aligned in quadrature. Hence, they need to be equalized again. Amplitude equalizer 208 equalizes the amplitudes of phase-aligned the I and Q paths.

The amplitude equalized and phase-aligned signals are provided to IF filter 206. IF polyphase filter 206 passes the desired RF signal from the I and Q paths and rejects the image signals.

Figure 3:
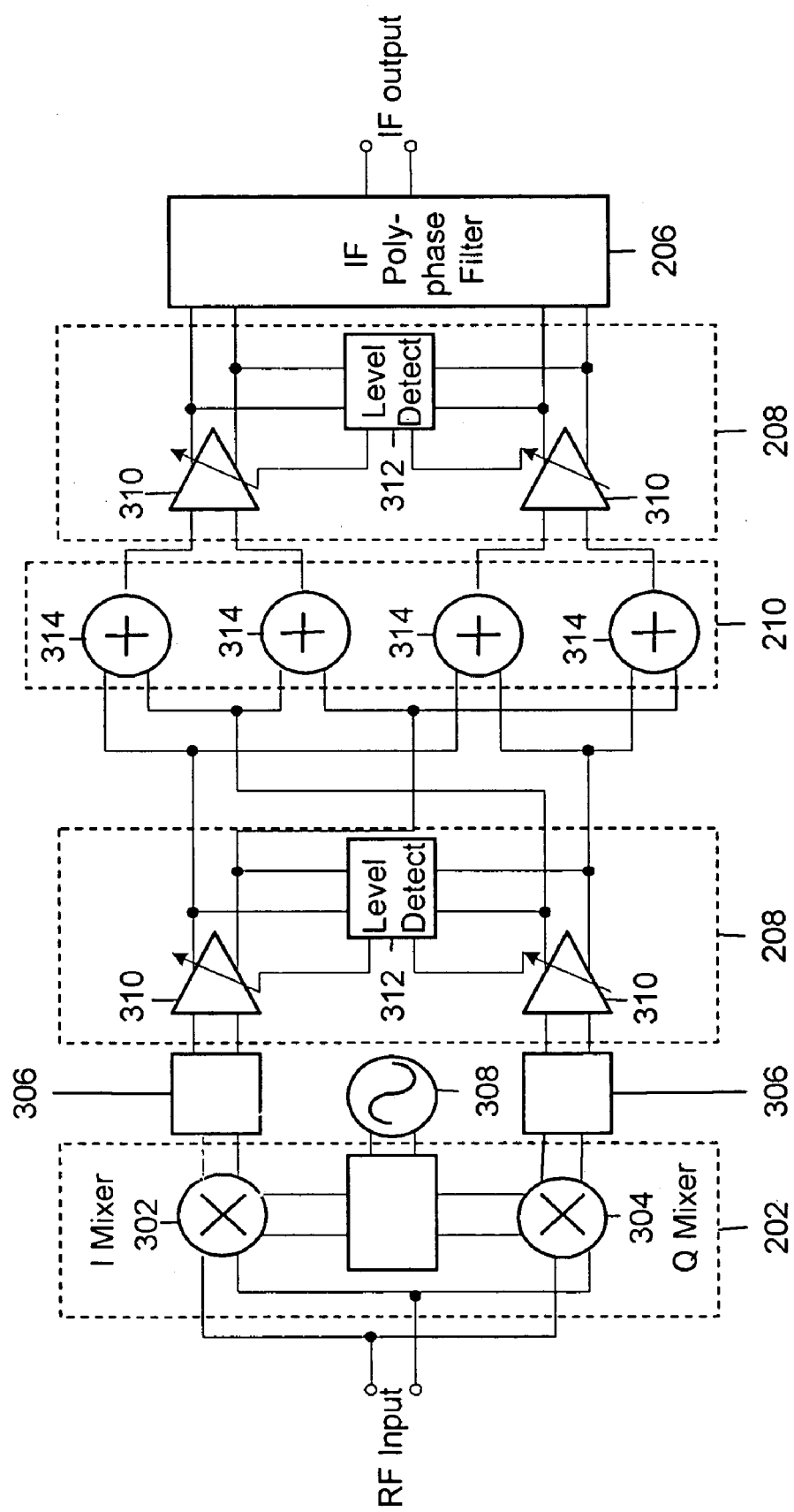
FIG. 3 is a view of a schematic representation of various elements of the IRM, in accordance with an embodiment of the invention.

FIG. 3 is a view of a schematic representation of various elements of IRM 102, in accordance with an embodiment of the invention. IRM 102 includes I/Q mixer 202, one or more channel reduction filters 306, amplitude equalizer 208, phase aligner 210, and IF polyphase filter 206. I/Q mixer 202 includes an I mixer 302, a Q mixer 304 and a Local Oscillator 308. Amplitude equalizer 208 also includes one or more Variable Gain Amplifiers (VGA) 310 and a level detect circuit 312. Phase aligner 210 includes four adders 314, hereinafter referred to as adders 314.

Differential input broadband RF signals are provided at the input ports of I mixer 302 and Q mixer 304. In various embodiments of the invention, the frequency of broadband RF signals may be in a range of 57 MHz to 1100 MHz. Local Oscillator 308 generates differential quadrature oscillator signals. I mixer 302 and Q mixer 304 mix the input broadband RF signals with the differential quadrature oscillator signals. The output paths of I mixer 302 and Q mixer 304, i.e., the I and Q paths, are also differential. In various embodiments of the invention, the I and Q paths may have unequal amplitudes and phase mismatch due to process variations of I mixer 302 and Q mixer 304. The I and Q paths of I/Q mixer 202 are thereafter provided to channel reduction filters 306. Channel reduction filters 306 eliminates LO leakage out of I/Q mixer 202 and reduces the number of broadband signals from the I and Q paths. In one embodiment of the invention, LO leakage from I/Q mixer 202 is low, and hence, channel reduction filters 306 may not be required. In various embodiments of the invention, the LO leakage from I/Q mixer 202 must be less than 16 dB lower than the minimum RF output from I/Q mixer 202.

Amplitude equalizer 208 equalizes the I and Q paths by means of VGAs 310 and level detect circuit 312. VGAs 310 amplify the differential signals of the I and Q paths. The amplified output signals of VGAs 310 are provided to level detect circuit 312. Level detect circuit 312 detects the difference in the amplitudes of the I and Q paths and accordingly adjusts the gains of VGAs 310.

Adders 314 add the differential signals of the I and Q paths with equalized amplitudes. An exact phase match of the differential signals of the I and Q paths is obtained by addition. The addition of the differential signals of the I and Q paths results in four differential output signals, hereinafter referred to as the I' and Q' paths. The I' and Q' paths include the following signals: $I_0+Q_0$, $I_0+Q_{180}$, $I_{180}+Q_0$ and $I_{180}+Q_{180}$. These four differential I' and Q' signals are in exact quadrature phase with each other. (Phase alignment by means of addition is described in detail in conjunction with FIG. 4.)

In various embodiments of the invention, the amplitudes of the differential signals of the I' and Q' paths may not be equal. In this event, the differential signals of the I' and Q' paths are provided to amplitude equalizer 208. Amplitude equalizer 208 equalizes the amplitudes of the I' and Q' paths. The output signals of amplitude equalizer 208 are provided to IF polyphase filter 206. IF polyphase filter 206 rejects the image signal and passes the desired RF signal as IF output signals. In various embodiments of the invention, the frequency of the RF signals present in the IF output signals may vary in a range of 0 to 4 MHZ.

In various embodiments of the invention, channel reduction filters 306 are low pass filters. VGAs 310 may be for example, transistor amplifiers, operational amplifiers and the like. In one embodiment of the invention, the various circuit elements of IRM 102 may be designed using by Complementary Metal Oxide Semiconductor (CMOS) technology. In another embodiment of the invention, the various circuit elements of IRM 102 may be designed by using Bipolar Junction Transistors (BJT).

Figure 4:
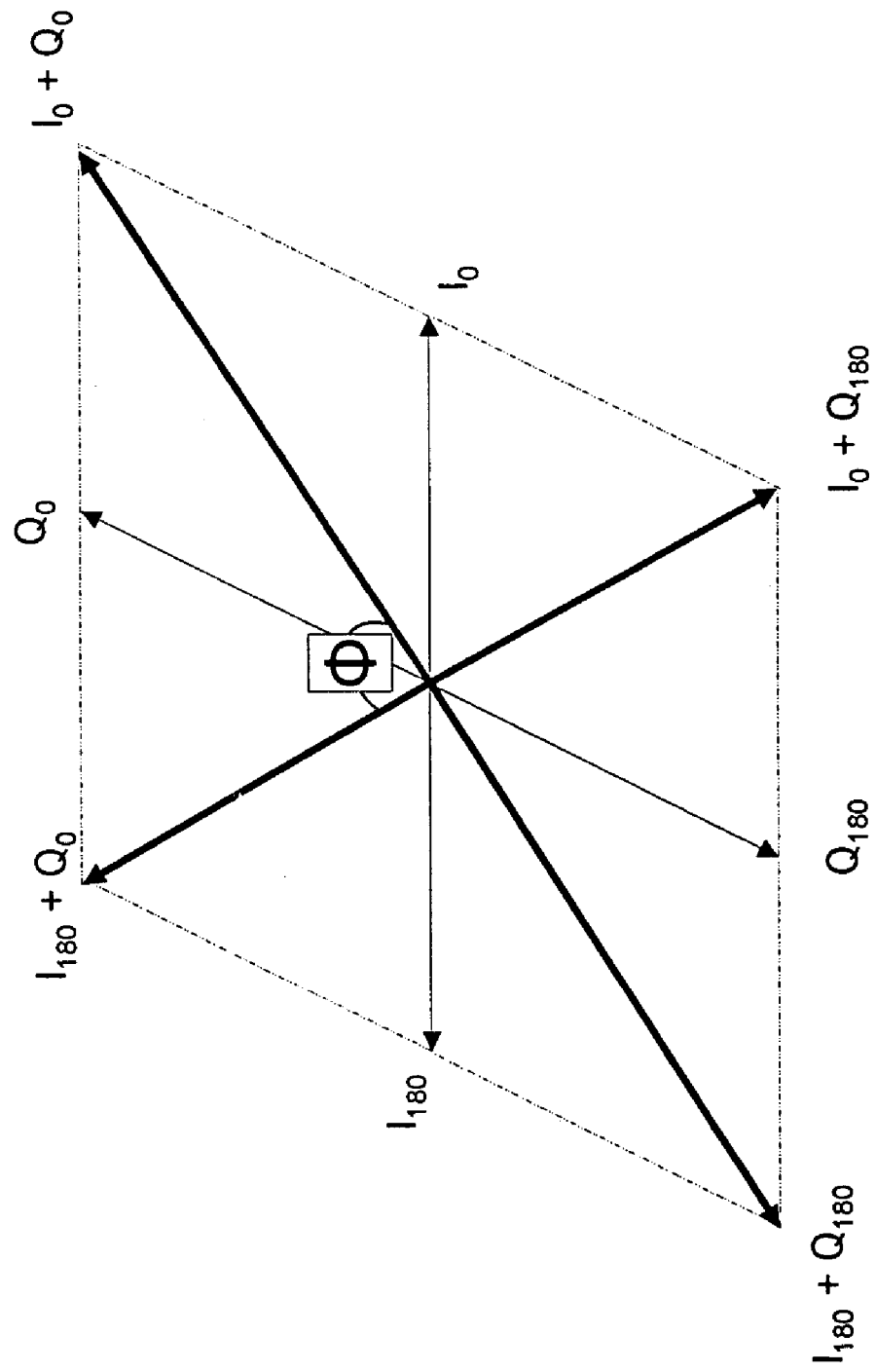
FIG. 4 is a view of a vector diagram depicting a phase alignment of differential signals of I and Q paths, in accordance with various embodiments of the invention.

FIG. 4 is a view of a vector diagram depicting the phase alignment of the differential signals of the I and Q paths, in accordance with various embodiments of the invention. This is explained with the help of two signals, resulting from the addition of the differential signals of the I and Q paths, i.e., $I_0+Q_0$ and $I_{180}+Q_0$. Signals $I_0+Q_0$ and $I_{180}+Q_0$ are hereinafter denoted by the X and Y signals, respectively. The phase difference $\phi_{diff}$ between the X and Y signals is calculated with the help of equation (1):

$$\Phi_{diff} = \frac{\pi}{2} - \cos^{-1}\left(\frac{2 \cdot |A| \cdot |B| \cdot \sin(\theta)}{\sqrt{4 \cdot |A|^2 \cdot |B|^2 \cdot \sin^2(\theta) + (|A|^2 - |B|^2)}}\right) \quad (1)$$

Further, the difference in the amplitudes of the X and Y signals is determined by the following equation (2):

$$|X| - |Y| = \sqrt{(|B| \cdot \cos(\theta) + |A|)^2 + |B|^2 \sin^2(\theta)} - \sqrt{(|B| \cdot \cos(\theta) - |A|)^2 + |B|^2 \sin^2(\theta)} \quad (2)$$

In the equations given above, A and B are the amplitudes of the differential signals of the I and Q paths, and θ is the phase difference between them. The phase difference, $\phi_{diff}$, is equal to 90 degrees for all values of θ, when the magnitude of A and B are equal, i.e., the amplitudes of the differential signals of the I and Q paths are equal. The difference in amplitude between X and Y signals is nonzero for θ not equal to 90 degrees.

Amplitude equalizer 208 equalizes the amplitudes of the X and Y signals. In various embodiments of the invention, the output RF signals, i.e., the output signals of amplitude equalizer 208 form the I' and Q' paths. The differential signals of the I' and Q' paths are equal in magnitude and are in exact quadrature phase. This provides more than 70 dB of image rejection for transmission of the desired RF signals.

Figure 5:
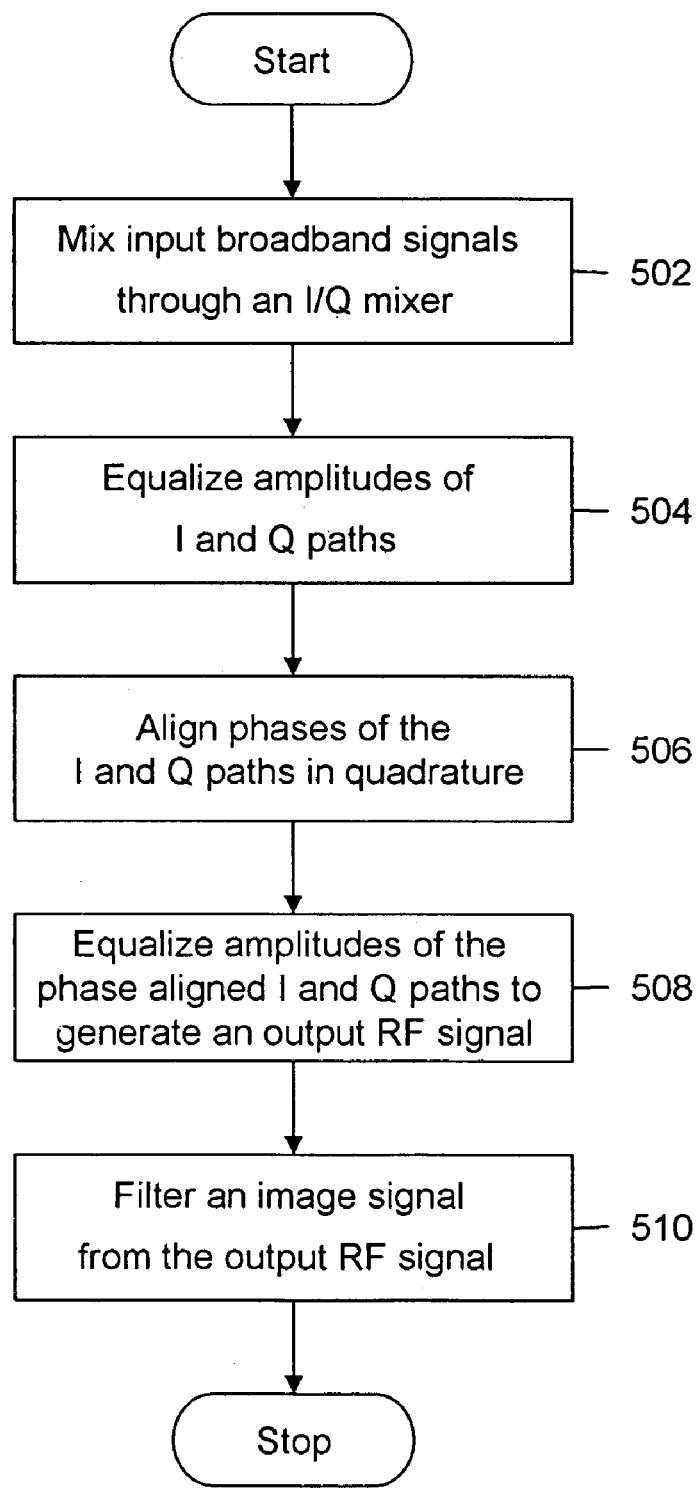
FIG. 5 is a view of a flowchart depicting a method for tuning broadband signals, in accordance with various embodiments of the invention.

FIG. 5 is a view of a flowchart depicting a method for tuning broadband signals, in accordance with an embodiment of the invention. At step 502, an I/Q mixer mixes the input broadband RF signals. During the mixing operation, the RF signals at a particular frequency are converted into RF signals at another frequency. The I/Q mixer generates I and Q paths. At step 504, the difference in the amplitudes of the differential signals of the I and Q paths is sensed. Thereafter, the amplitudes are equalized by amplifying the signals based on the difference.

At step 506, the phases of the I and Q paths with equalized amplitudes are aligned in quadrature. They are aligned in quadrature by adding differential signals of the I and Q paths. The addition of the differential signals of the I and Q paths ($I_0$, $I_{180}$, $Q_0$ and $Q_{180}$), results in differential I' and Q' paths ($I_0+Q_0$, $I_0+Q_{180}$, $I_{180}+Q_0$ and $I_{180}+Q_{180}$) that are in exact phase quadrature. In various embodiments of the invention, the amplitudes of the differential signals of the I' and Q' paths, obtained after phase alignment, are unequal. At step 508, the amplitudes of the differential signals of the I' and Q' paths are equalized, to generate the desired output RF signal. At step 510, the image signals are filtered out from the output RF signals. The filter rejects the image signals and passes the desired RF signal. This results in an IF signal at the output port of the filter. In various embodiments of the invention, the resulting output IF signal is in the range of 4 MHz.

In one embodiment of the invention, the system and method as described in conjunction with FIG. 3 and FIG. 5 may be utilized in a broadband digital data system. In an alternative embodiment of the invention, the system and method as described in conjunction with FIG. 3 and FIG. 5 may be utilized in a broadband analog system.

The system and method described above has a number of advantages. The system provides an image rejection of more than 70 dB without substantially increasing the size of the tuner. Further, the system provides high linearity and high signal-to-noise ratio in RF transmission. The analog circuits of the TV tuner, as described in the present invention, do not require any particular transistor device type, and can be integrated by using CMOS technology. The system for TV tuning can also be implemented in the digital domain. Further, the system for equalizing the I and Q outputs of an I/Q mixer can be used to equalize any arbitrary I/Q signal to improve the I and Q amplitude and phase match.

While the foregoing is directed to embodiments of the present invention, other and further embodiments of the invention may be devised without departing from the basic scope thereof, and the scope thereof is determined by the claims that follow.

The invention claimed is:

1. A broadband tuner comprising:
   an I/Q mixer, the I/Q mixer mixing input broadband signals;
   at least one amplitude equalizer, the at least one amplitude equalizer equalizing amplitudes of I and Q paths generated by the I/Q mixer;
   a phase aligner, the phase aligner aligning phases of the I and Q paths with equalized amplitudes to generate an output RF signal, wherein the phases are aligned in quadrature; and
   a polyphase filter, the polyphase filter filtering an image signal from the output RF signal.

2. The broadband tuner according to claim 1, wherein the at least one amplitude equalizer comprises a plurality of Variable Gain amplifiers (VGA), the plurality of VARs amplifying the I and Q paths.

3. The broadband tuner according to claim 1, wherein the at least one amplitude equalizer comprises a level detect circuit, the level detect circuit sensing difference in amplitudes of the I and Q paths.

4. The broadband tuner according to claim 1, wherein the phase aligner comprises at least four adders, the at least four adders adding differential signals of the I and Q paths.

5. The broadband tuner according to claim 1, wherein at least one of the I/Q mixer, the at least one amplitude equalizer, the phase aligner and the polyphase filter are designed using analog design techniques.

6. The broadband tuner according to claim 1, wherein at least one of the I/Q mixer, the at least one amplitude equalizer, the phase aligner and the polyphase filter are designed using digital design techniques.

7. The broadband tuner according to claim 1, wherein at least one of the I/Q mixer, the at least one amplitude equalizer, the phase aligner and the polyphase filter are designed using complementary metal oxide semiconductor (CMOS) technology.

8. The broadband tuner according to claim 1, wherein the input broadband signals are supplied through a Community Access Television (CATV) infrastructure.

9. A broadband digital data system utilizing the broadband tuner of claim 1.

10. A broadband analog system utilizing the broadband tuner of claim 1.

11. A method for tuning broadband signals, the method comprising the steps of:
    mixing input broadband signals, wherein the mixing is performed by an I/Q mixer;
    equalizing amplitudes of I and Q paths generated by the I/Q mixer;
    aligning phases of the I and Q paths with equalized amplitudes to generate phase-aligned I and Q paths, wherein the phases are aligned in quadrature;
    equalizing amplitudes of the phase-aligned I and Q paths to generate an output RF signal; and
    filtering an image signal from the output RF signal.

12. The method according to claim 11, wherein the step of equalizing amplitudes of I and Q paths comprises the step of sensing difference in amplitude of the I and Q paths.

13. The method according to claim 11, wherein the step of aligning phases of the I and Q paths comprises the step of adding differential signals of the I and Q paths with equalized amplitudes.

14. The method according to claim 11, wherein the input broadband signals are supplied through a Community Access Television (CATV) infrastructure.

* * * * *